May 23, 1967 G. L. GRISDALE 3,321,579

APPARATUS FOR USE IN THE DETECTION OF THE AVERAGE PHASE OF SYNCHRONIZING SIGNALS IN A START-STOP TELEGRAPH SYSTEM

Filed June 10, 1963 2 Sheets-Sheet 1

INVENTOR
George Lambert Grisdale
BY
Baldwin & Wight
ATTORNEYS

May 23, 1967 G. L. GRISDALE 3,321,579

APPARATUS FOR USE IN THE DETECTION OF THE AVERAGE PHASE OF SYNCHRONIZING SIGNALS IN A START-STOP TELEGRAPH SYSTEM

Filed June 10, 1963

2 Sheets-Sheet 2

INVENTOR

George Lambert Grisdale

BY

Baldwin & Wight

ATTORNEYS

United States Patent Office 3,321,579
Patented May 23, 1967

3,321,579

APPARATUS FOR USE IN THE DETECTION OF THE AVERAGE PHASE OF SYNCHRONIZING SIGNALS IN A START-STOP TELEGRAPH SYSTEM

George Lambert Grisdale, Great Baddow, England, assignor to The Marconi Company Limited, a British company Filed June 10, 1963, Ser. No. 286,540
Claims priority, application Great Britain, June 20, 1962, 23,738/62
6 Claims. (Cl. 178—88)

This invention relates to apparatus for detecting the average phase of telegraph signals.

Figure 1:
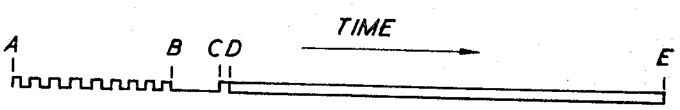
Figure 2:
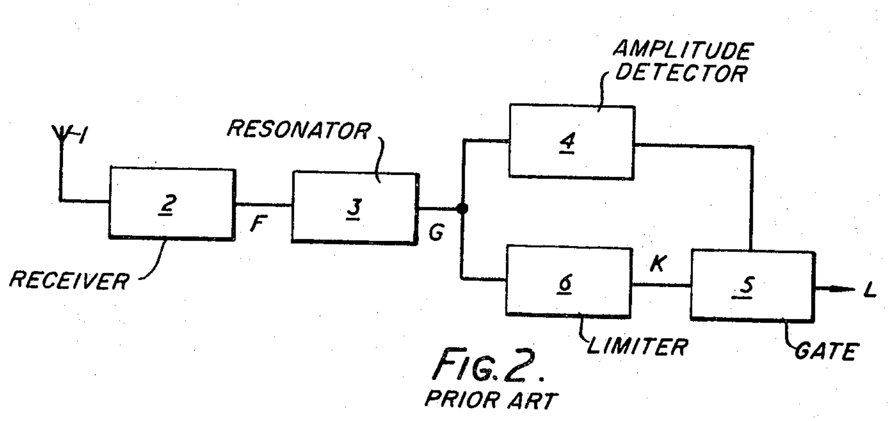
Figure 3:
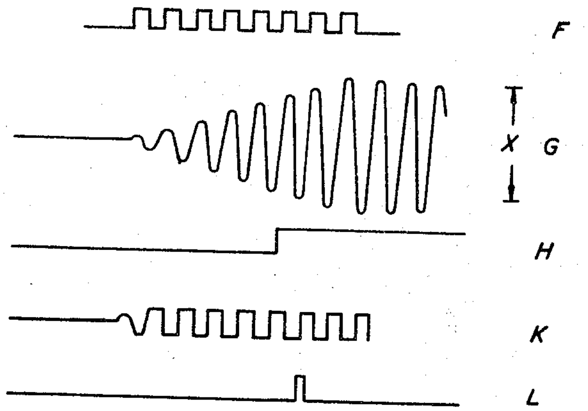
Figure 4:
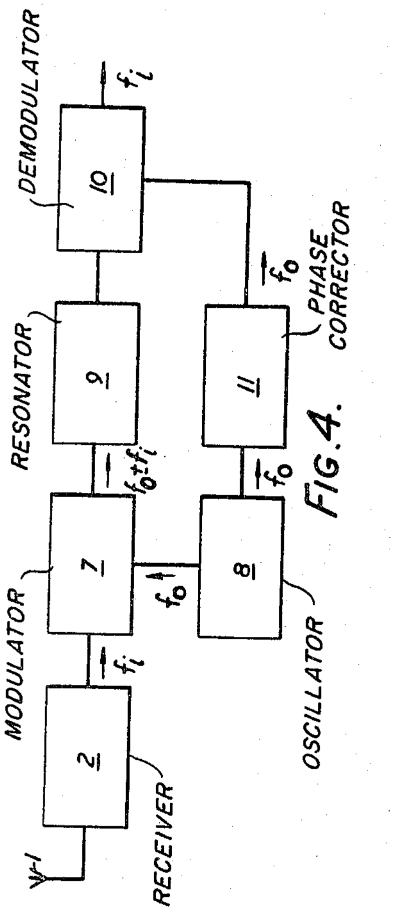
Figure 5:
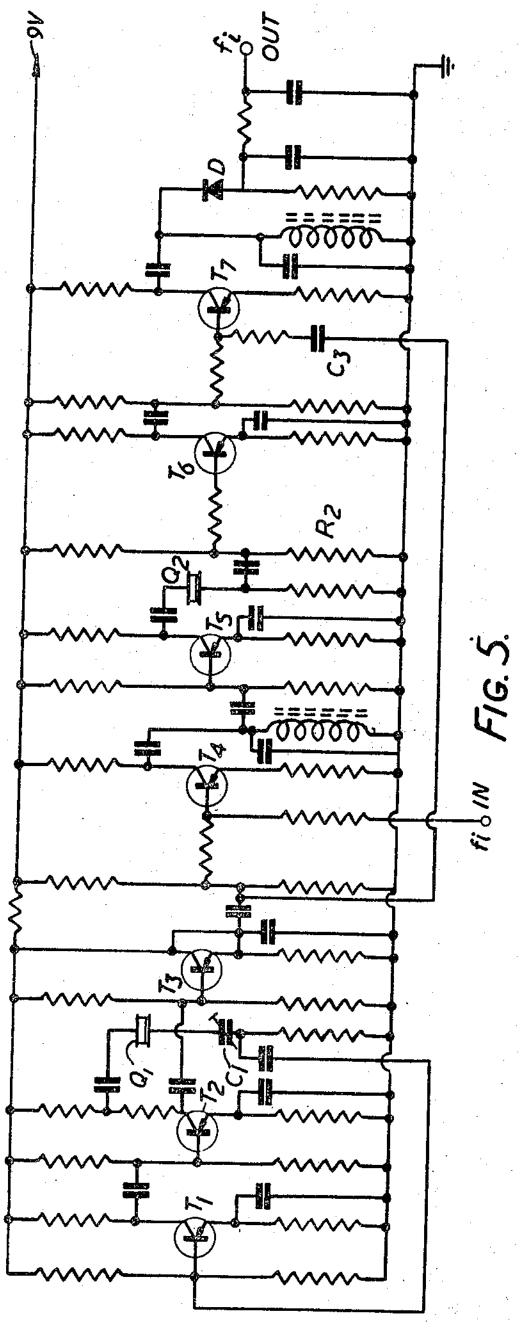

The invention is illustrated and explained in connection with the accompanying drawings in which FIGURES 1 and 3 are explanatory graphical figures; FIGURE 2, which is provided for explanatory purposes, is a block diagram of a typical known apparatus for detecting the average phase of telegraph signals; and FIGURES 4 and 5 illustrate an embodiment of the present invention, FIGURE 4 being a simplified block diagram and FIGURE 5 being a circuit diagram representation of the same embodiment.

In most modern telegraph systems the message is converted into a two-position (binary) telegraph code of signal elements—usually termed "mark" and 'space"—for sequential transmission, the elements being transmitted by modulating an electric current between two predetermined limits of amplitude or (more usually in radio telegraph) between two predetermined limits of frequency (frequency-shift telegraphy). At the receiver the received signal is detected and converted into a direct current voltage which assumes one or another of two predetermined values in dependence upon whether a particular signal element received at any time is mark or space. The D.C. voltages are then used to actuate a teleprinter or other equipment which reproduces the message from the coded signals.

The coding of the message transforms each character there into a sequence of a predetermined number (commonly 5) of pulses of equal length and which are of one or other of two values termed the mark and space values. In a teleprinter telegraph system each signal element or pulse is usually about 20 ms. long. The equipment which reproduces the message from the received detected coded signals must, of course, examine each signal element to determine whether it is a mark or a space and this determination is normally done by sampling each element at the centre of its time of duration. Correct sampling involves arrangement of the equipment to take the samples at the correct times—the mid-points of the element—and this is normally ensured in the case of a teleprinter telegraph system by sending a recognisable "start" pulse before each sequence of elements representing a character. Since a start pulse precedes each sequence of elements representing a character and is used to time the beginning of the sampling of said sequence, it is comparatively simple to take accurately timed samples at the centers of the elements in the message sequence when the sequence of elements following each start pulse is relatively short. No difficulty is encountered in using mechanical means for timing the sampling since such mechanical means have to maintain accuracy of timing only for the duration of one character or sequence of elements.

When long-distance radio transmission is in question, high frequency waves are usually employed and, because of fading, bad and varying signal/noise ratio and similar difficulties, distortion of received telegraph signals is common, causing the occurrence of false or misplaced start pulses in the received message with consequent printing of one or more wrong characters. Errors of this nature are particularly serious in the case of messages such as aircraft flying data reports, inasmuch as individual characters in such messages are of vital importance to the over-all meaning of the message. Such a coded message, conventionally arranged and of fixed length and format, might be composed of, say, 30 to 40 characters whose individual positions in the message determine the nature of the information conveyed thereby, conveying information of aircraft position, course, speed . . . and so on and having, say 100 to 200 separate telegraph elements per character. For the correct interpretation of such a message, the position of each element therein must be correctly known and it is therefore essential to determine not only the center point of each element but also the instant at which the message commences and finishes. Such determination is called synchronising and it is with such synchronising that the present invention is concerned.

FIGURE 1 is a conventional representation of a typical message, such as an aircraft flying data report, as ordinarily transmitted. Transmission starts at time A with a series of element reversals, i.e. alternate marks and spaces of constant individual length. This series continues until time B, the elements sent from time A to time B constituting synchronising pulses for use in determining the center points of the code elements which follow. From time B to time C follows an interval in which the transmission is in either the mark or the space condition (as represented, the space condition) and, at C, the transmission changes over to the other condition. This changeover at time C identifies this time as the first pulse of the message proper, it being, of course, necessary for identification that the pulse starting at C must always be the same telegraph condition (space, or mark). The actual coded message occurs between times D and E, timing of detection starting at time C. In teleprinter transmission each transmitted character begins with the start pulse C–D which serves both for identifying the start of a symbol and determining the sampling points for the coded pulses constituting the coded symbol. Because of the liability of distortion in radio transmission, it is in practice necessary to select an average sampling point over a number of pulses and it is to enable this to be done that the preliminary succession of pulses are sent from time A to time B. By using the average timing of these synchronising pulses to determine the sampling points in the message proper, errors can be much reduced. In order that a receiver may recognize the pulses in the period A–B as synchronising pulses, the pulse frequency in that period is often selected at a different value from that in the message proper but, of course, in fixed time relation with them.

It is to be noted that the aforementioned distortion frequently results in variations in the time period between the trailing edge of a received pulse and the leading edge of the pulse immediately following. Thus, radio transmission distortion results not only in a malformation of pulses but in a phase distortion in that portion of the transmitted signal from A to B in FIGURE 1. If, however, the totality of time differences between pulses in the received signal were to be averaged, the average time difference would closely approximate the time differences between the originally transmitted pulses. A series of pulses having time separations corresponding to the aforementioned average time separations, then, would not display the previously mentioned phase distortion. It is the phase relationship between pulses in an ideal series of pulses that is characterized by the term "average phase" as used herein.

FIGURE 2 is a block diagram of a typical known receiver arrangement for achieving synchronisation, typical waveforms at lettered points in FIGURE 2 being represented graphically in FIGURE 3. Referring to FIGURE 2, a receiving aerial is represented at 1 and a telegraph receiver at 2, line F of FIGURE 3 representing the output (at point F of FIGURE 2) from the receiver during reception of the synchronising pulses. This output is applied to a resonator 3 of high Q which is tuned to the fundamental frequency of the square wave output. The arrangement of FIGURE 2 detects the average phase of the telegraph elements A–B by applying the telegraph signal to resonator 3. The output of resonator 3 builds up as shown in FIGURE 3 at G, and due to the resonant action of the resonator 3, the output of such resonator is of one frequency, any small variations in the frequency, or more correctly phase, from cycle to cycle of the input pulse train A–B being effectively smoothed or averaged out. The resonator output which is fed to an amplitude detector 4 builds up as shown at G in FIGURE 3 until a predetermined amplitude $x$ is reached which is sufficient to trigger a triggered gate circuit 5. This gate circuit receives its input via a limiter 6 from the resonator 3, the limiter shaping the rising waveform shown at G substantially into a square wave as shown at K. The trigger action is conventionally represented by the step in the representation in line H of FIGURE 3. The result is to produce from gate 5 a telegraph synchronising pulse as shown at L the first time the waveform at G crosses the axis in the positive direction after reading the predetermined value $x$. The resultant pulse L is then used, in a manner well known in the art, to indicate the proximity of a start pulse C–D identifying the start of the message, and to indicate the proper sampling instants for the following message. The process involved in producing the pulse L, which is used to synchronize the pulse sampling circuitry, involves producing a signal, G, which is representative of the average phase or time relation of the pulses A–B, and then utilizing the signal G to control the production of the pulse L so that the latter is in predetermined time relation with G. In other words, the instant in time at which the pulse L occurs depends upon two factors: firstly, the number of cycles in the output from resonator 3 required to reach the predetermined level X (this factor for a given resonator 3 is fixed), and, secondly, the instant in time at which the synchronizing train A–B starts (this factor is, of course, variable). Any phase variations in the subsequent train A–B are "averaged out" by the resonator 3.

Thus, the pulse producing portion of the circuit shown in FIGURE 2, comprising amplitude detector 4, gate circuit 5 and limiter 6, utilizes signal G to produce pulse L indicative of the average phasing of the received signal inasmuch as variations in phasing present in the original received signal have been "averaged out" by the production of signal G. This pulse producing portion of the circuit of FIGURE 2, then, provides a typical means for "detecting" the average phase of the original signal A–B.

Apparatus as shown in FIGURE 2 is not satisfactory for use in transmission systems which have to operate with relatively slow telegraph speeds or modulation rates, e.g. long distance data transmission systems. In such systems the resonance frequency of the resonator 3 would probably have to be in the range of 10–50 c./s. and the achievement of a high Q stable resonator resonant at such a frequency—indeed the achievement of any electrically tuned circuit of high Q and good stability resonant at such a frequency—is very difficult, if not impracticable. It would in any case be heavy, bulky and expensive. For this reason mechanical resonators of the vibrating reed type have been used in place of purely electrical resonators at 3 (FIGURE 2) but these are very sensitive to mechanical disturbance and quite impractical for use in circumstances where they are likely to be subjected to shock or vibration, e.g. in mobile equipment. The present invention seeks to avoid the defects of an arrangement as shown in FIGURE 2 depending on a resonator operating at the synchronizing pulse frequency for its operation.

According to this invention telegraph receiver equipment having means for detecting the average phase or timing of telegraph elements in a sequence of received elements occurring at a predetermined element frequency comprises a high Q resonator, resonant at a frequency which is high relative to said telegraph element frequency, a modulator fed with signals at the said predetermined element frequency and also with local oscillations from a local oscillator at a frequency differing from said resonant frequency by said predetermined element frequency, a demodulator fed with output from said resonator and also with local oscillations from the same local oscillator, and means for utilising the output from the demodulator for detecting said average phase or timing of the synchronizing pulses.

Preferably the resonator is an electro-mechanical resonator to give high Q value, e.g. a piezo-electric crystal, and preferably also the local oscillator is piezo-electrically controlled.

Preferably again the frequency-temperature characteristics of the local oscillator and the resonator are similar.

The apparatus may include inserted phase correction means of known predetermined phase shift adapted to ensure a predetermined phase relation between the detected output from the demodulator and the signal input to the modulator.

In preferred practice the local oscillation frequency is of the order of 200 to 2000 times the telegraph element frequency.

FIGURE 4 is a block diagram of one embodiment of the invention. Referring to FIGURE 4, the aerial 1 and telegraph receiver 2 are as in FIGURE 2, but the output from the receiver at the synchronising pulse frequency $f_1$ is fed to a modulator 7. Modulator 7 receives the output signal from receiver 2, which signal comprises the numerous received elements of predetermined frequency $f_1$ and, further, modulator 7 is also fed with locally generated oscillations of frequency $f_0$ from an oscillator 8 of relatively high frequency, e.g. 20,000 c./s. The resulting sum or difference frequency is fed to a high Q resonator 9 resonant at the sum or difference frequency as the case may be. The resonator output is fed to a demodulator 10 where demodulation is effected by beating it with output from the oscillator 8. If required a simple phase correction circuit 11 to correct for phase shift in the units 7–9–10 may be interposed as shown between 8 and 10. The output from unit 10 is a substantially sinusoidal output of frequency $f_1$, but because the same oscillator 8 is used both for modulation and demodulation, the phase of the output from unit 10 is simply related to the output from the receiver 2. The output from unit 10 builds up in the same way as that from resonator 3 of FIGURE 2 and may be used in the same way. The arrangement of FIGURE 4 may be used to provide the necessary inputs to detector 4 and limiter 6 of FIGURE 2 resulting in an output from gate 5 as described hereinabove.

Assuming that $f_1$ is 100 c./s. and $f_0$ 20 kc./s. and that the sum frequency 20,000 c./s. is employed, the resonator 9 being resonant at this frequency. A quite practical quartz resonator may be used for this frequency. Clearly, if the same bandwidth for the resonator 9 is to be obtained as with a resonator (3 of FIGURE 1) resonant at the original frequency $f_1$, the high frequency resonator must have a Q value of (approximately) 200 times that of the low frequency one. Also if the bandwidth is to be less than, say, 1 c./s. the stability of the oscillator 8 must tbe much better than this. These requirements can, however, be fairly readily satisfied with the aid of quartz resonators, though in some cases it will be necessary, in the interests of frequency stability, to house them in thermostatically controlled ovens to protect them against ambient temperature variations.

FIGURE 5 which is a circuit diagram showing parts of a transistorised equipment as shown in block diagram form in FIGURE 4, requires little further description. The output from the receiver 2 (not shown in FIGURE 5) is applied at the terminal marked $f_1$ IN. The oscillator (8 of FIGURE 4) comprises the quartz crystal Q1 and the transistors $T_1$ and $T_2$ which are in an amplifier circuit maintaining the crystal $Q_1$ in oscillation. $C_1$ is a pre-set variable condenser for fine adjustment of local oscillator frequency. Transistor $T_3$ is in a buffer amplifier through which local oscillations are fed to the modulator or first frequency changer (7 in FIGURE 4) in which the active element is the transistor $T_4$. Output from the modulator is amplified in an amplifier comprising transistor $T_5$, the output from which is applied to the quartz resonator $Q_2$ (9 in FIGURE 4). Voltage builds up in this quartz resonator as already described and, appearing across resistance $R_2$, is amplified by a further amplifying transistor $T_6$ the output from which is fed to transistor $T_7$ to the base of which local oscillations are also applied through condenser $C_3$. The combined signal and oscillator voltage from $T_7$ is applied to the detecting diode D from which output $f_1$ appears at the terminal OUT. Obviously phase change may occur in passing through the transistor circuits. The phase may be corrected to any desired value by inserting a phase-changing network in one of the amplifiers or in the oscillator input path to the demodulator or in a circuit following the detector D. Clearly such a network will be smaller, for a given correction, if inserted in a circuit preceding detection. In the illustrated circuitry of FIGURE 5 condenser C3 influences the phase of the oscillator input to the demodulator.

I claim:

1. In telegraph receiver equipment having means for detecting the average phase or time relation of telegraph elements in a sequence of received elements occurring at a predetermined element frequency; modulator means for receiving a signal comprising a number of received elements at a first predetermined element frequency, local oscillator means for providing a signal having a second frequency, said modulator means being electrically connected to said oscillator means for producing a signal having a third frequency which differs from the second frequency by the element frequency and which is greater than said element frequency, high Q resonator means responsive to the modulator signal and resonant at said third frequency, demodulation means electrically connected to said local oscillator means and said resonator means and adapted for electrical connection to said phase or time detection means.

2. Apparatus in accordance with claim 1 wherein said resonator means comprises a high Q electro-mechanical resonator.

3. Apparatus in accordance with claim 2 wherein said resonator means comprises a piezoelectric crystal.

4. Apparatus in accordance with claim 1 wherein said oscillator means and resonator means are of similar frequency-temperature characteristics.

5. Apparatus in accordance with claim 1 further including phase correction means for establishing a predetermined phase relation between said signal of first predetermined element frequency and the demodulation means output.

6. Apparatus in accordance with claim 1 wherein said oscillator means provides a signal having a frequency within the range of 200 to 2000 times said element frequency.

References Cited by the Examiner

UNITED STATES PATENTS

| | | | |
|---|---|---|---|
| 2,914,612 | 11/1959 | Davey et al. | 178—53.1 |
| 3,019,296 | 1/1962 | Schelleng | 325—434 |
| 3,022,375 | 2/1962 | Davey | 178—53.1 |

JOHN W. CALDWELL, *Acting Primary Examiner.*

S. J. GLASSMAN, J. T. STRATMAN, *Assistant Examiners.*